US012584817B2

(12) United States Patent
Sato et al.

(10) Patent No.: US 12,584,817 B2
(45) Date of Patent: Mar. 24, 2026

(54) STRIKING DEVICE

(71) Applicant: IMPACT CO., LTD., Oita (JP)

(72) Inventors: Mihoe Sato, Oita (JP); Susumu Horino, Oita (JP)

(73) Assignee: IMPACT CO., LTD., Oita (JP)

( * ) Notice: Subject to any disclaimer, the term of this patent is extended or adjusted under 35 U.S.C. 154(b) by 337 days.

(21) Appl. No.: 18/013,978

(22) PCT Filed: Jul. 5, 2021

(86) PCT No.: PCT/JP2021/025379
§ 371 (c)(1),
(2) Date: Dec. 30, 2022

(87) PCT Pub. No.: WO2022/009853
PCT Pub. Date: Jan. 13, 2022

(65) Prior Publication Data
US 2023/0288285 A1     Sep. 14, 2023

(30) Foreign Application Priority Data

Jul. 10, 2020    (JP) ................................ 2020-119105

(51) Int. Cl.
*G01M 7/08*       (2006.01)
*G01N 3/307*      (2006.01)
*G01N 3/30*       (2006.01)

(52) U.S. Cl.
CPC ................. *G01M 7/08* (2013.01); *G01N 3/30* (2013.01); *G01N 3/307* (2013.01)

(58) Field of Classification Search
None
See application file for complete search history.

(56) References Cited

U.S. PATENT DOCUMENTS 2,506,607 A * 5/1950 Mckendry ................ G01N 3/30
                                      73/11.01
3,331,236 A * 7/1967 Payne .................. G01N 29/045
                                      73/12.04

(Continued)

FOREIGN PATENT DOCUMENTS

CN       108254273 A * 7/2018          G01N 3/04
JP       2003254948 A * 9/2003

(Continued)

OTHER PUBLICATIONS

International Search Report issued Sep. 21, 2021 in International Application No. PCT/JP2021/025379.

*Primary Examiner* — Stephen D Meier
*Assistant Examiner* — Ruben C Parco, Jr.
(74) *Attorney, Agent, or Firm* — Wenderoth, Lind & Ponack, L.L.P.

(57) ABSTRACT

A striking device includes a striking section that strikes a test object. This striking device is characterized by having: a vertically long intermediate link that is coupled to the striking section and can move in a state of maintaining a vertical orientation; and a laterally long driving link and a driven link that is driven by the driving link, one end of each of the driving link and the driven link being rotatably coupled to the intermediate link, and the driving link and the driven link being parallel to each other, in that the other end side of each of the driving link and the driven link rotates about a rotational shaft that is provided in a perpendicular direction to a vertical line at different positions on the same vertical line.

4 Claims, 5 Drawing Sheets

(56)                    References Cited

U.S. PATENT DOCUMENTS

| | | | | | |
|---|---|---|---|---|---|
| 4,446,734 | A | * | 5/1984 | Empson | G01N 29/045 |
| | | | | | 173/205 |
| 5,922,937 | A | * | 7/1999 | Kowalski | G01N 3/30 |
| | | | | | 73/12.14 |
| 2019/0003942 | A1 | * | 1/2019 | Howie | G01N 3/303 |

FOREIGN PATENT DOCUMENTS

| | | |
|---|---|---|
| JP | 2015-219028 | 12/2015 |
| JP | 2016-50802 | 4/2016 |

* cited by examiner

[Fig. 1]
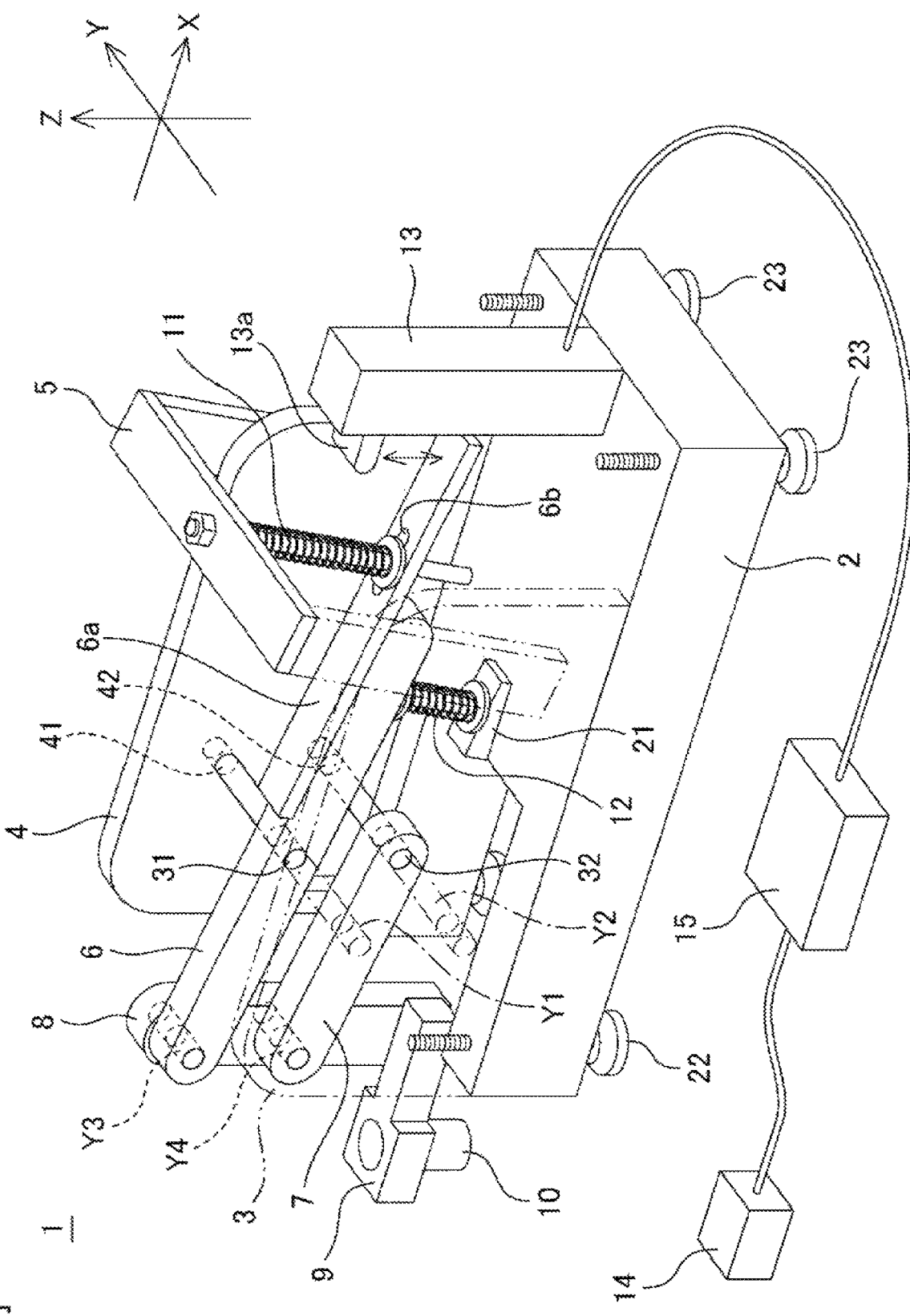

[Fig. 2]
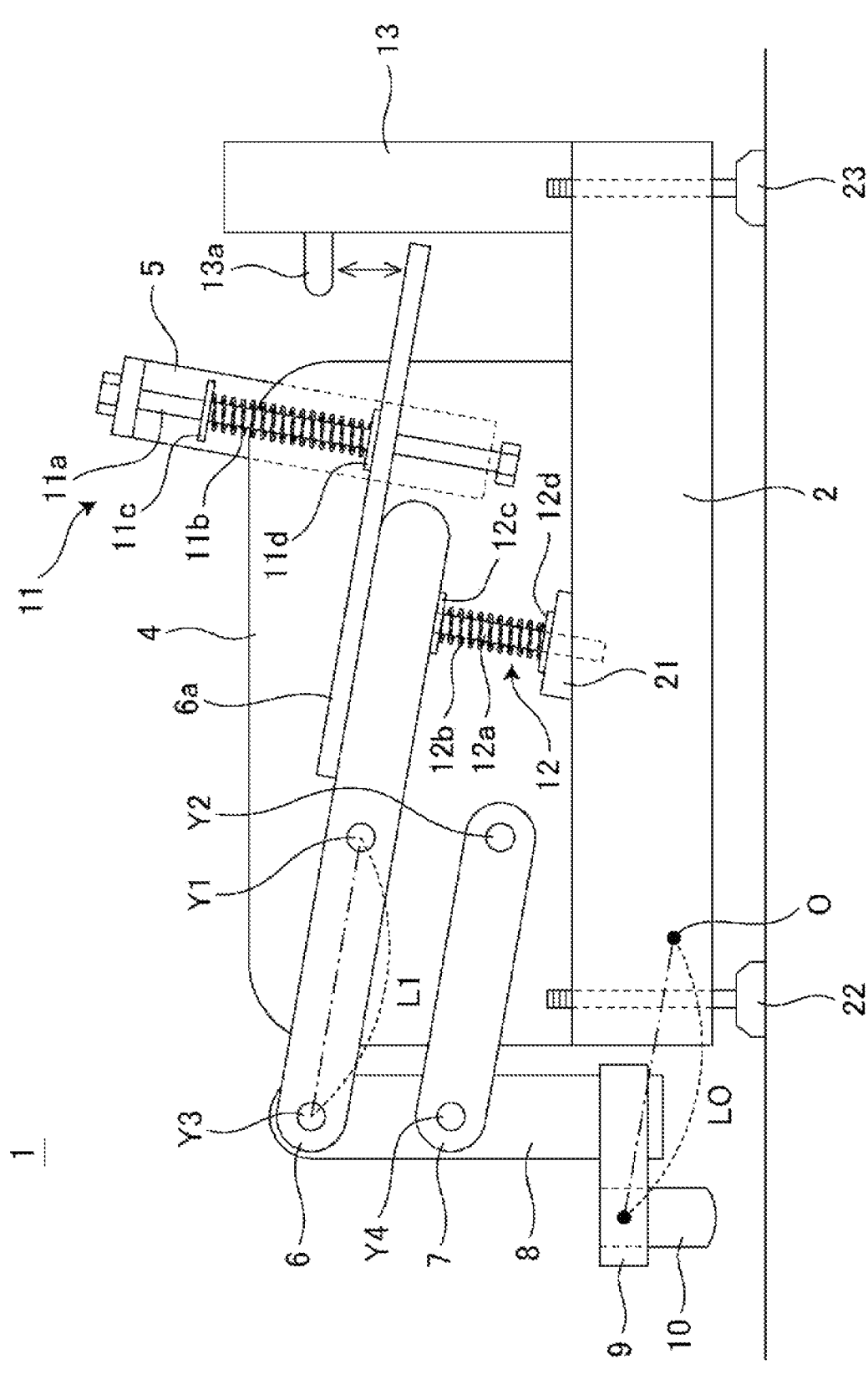

[Fig. 3]
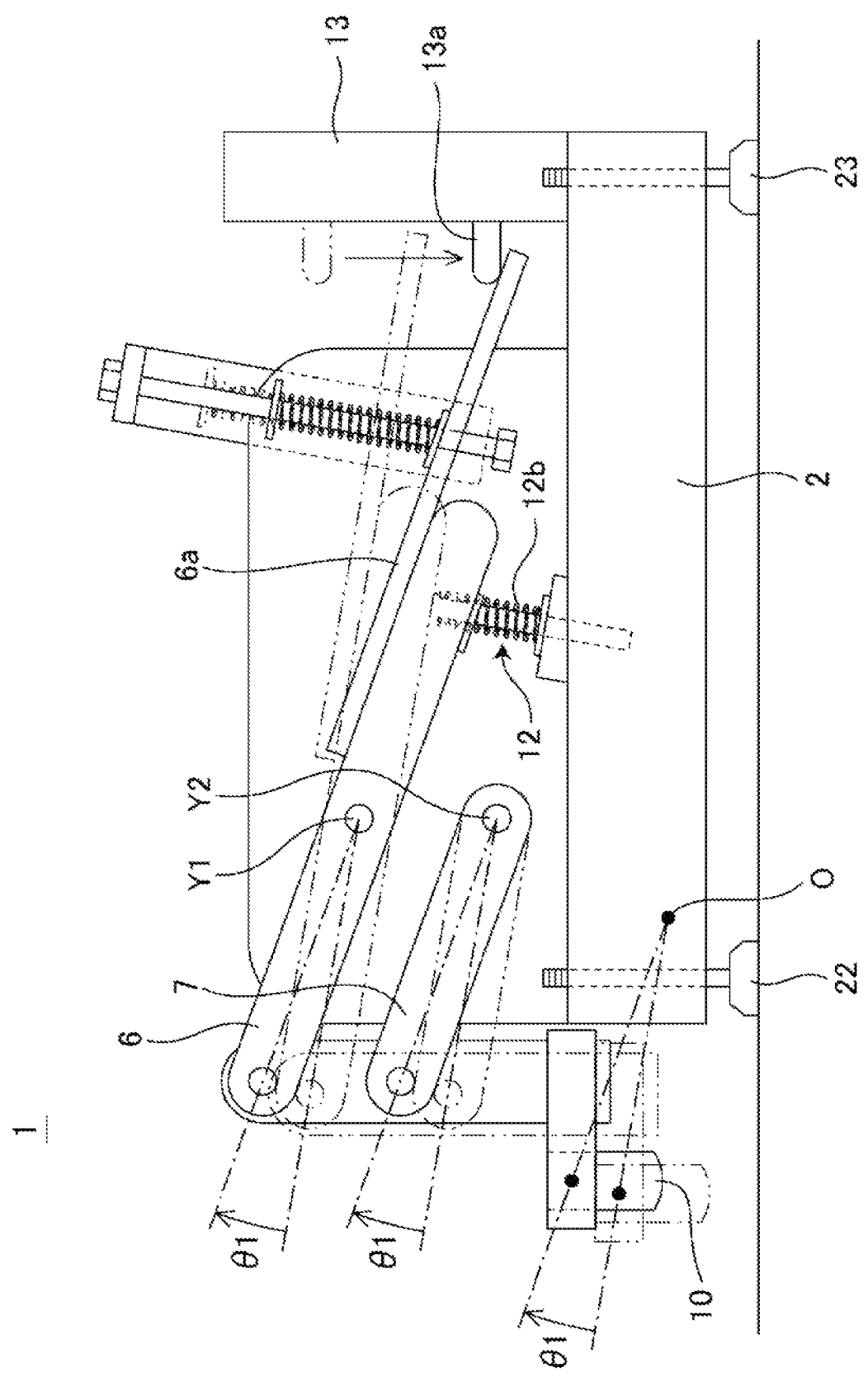

[Fig. 4]
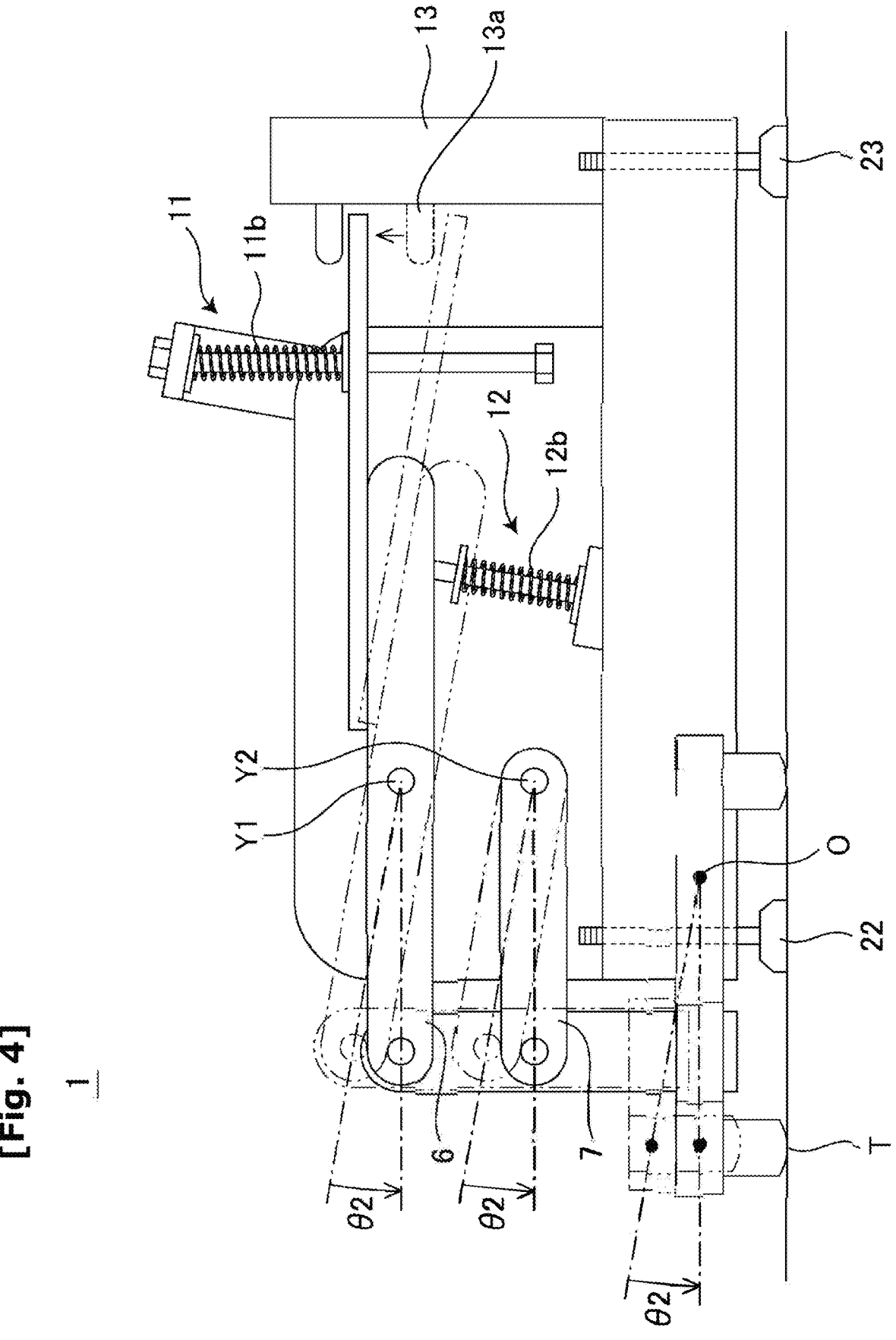

[Fig. 5]
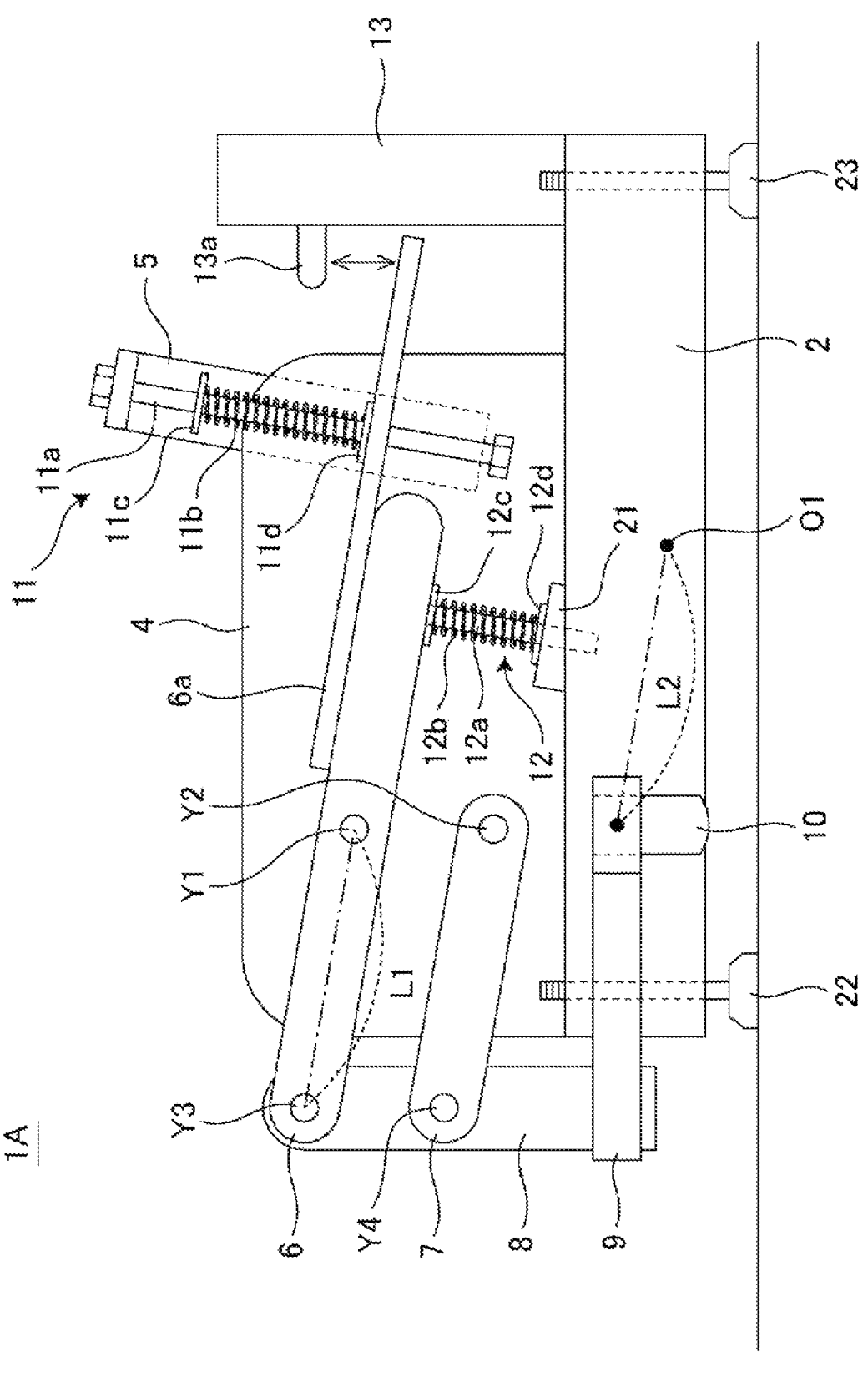

1

STRIKING DEVICE

TECHNICAL FIELD

The present invention relates to a striking device.

BACKGROUND ART

The following device has conventionally been known. The device inspects a defect such as a crack of a test object on the basis of striking sound at the time when a steel material such as a hammer strikes the test object such as concrete (for example, see PTL 1 and 2).

A technique related to a striking device for hammering test is disclosed in PTL 1. The striking device includes: an extendable and swingable boom; a striking unit provided at a tip of the boom and strikes the test object; and a detection sensor for detecting that the striking unit has reached a striking position at which the striking unit strikes the test object. According to the technique related to PTL 1, the striking device can appropriately and easily be positioned for the test object.

A technique related to a hammering test apparatus for a structure has been disclosed in PTL 2. In the hammering test apparatus, a striking device that strikes the structure and a microphone that measures striking sound at the time of a strike are mounted to a multi-rotor helicopter. According to the technique related to PTL 2, the hammering test of the structure can easily be performed at a high altitude by using the multi-rotor helicopter.

CITATION LIST

Patent Literature

PTL 1: JP2016-50802A
PTL 2: JP2015-219028A

SUMMARY OF INVENTION

Technical Problem

However, the conventional striking device for the hammering test described above has a complicated control configuration or device configuration. In addition, there is a problem that, for example, the manual simple striking device for the hammering test cannot accurately strike a striking point, that is, a point to be struck in the test object at the time of the strike.

The invention has been made in view of the above point and therefore has a purpose of providing a striking device capable of accurately striking a striking point with a simple device configuration.

Solution to Problem

In order to achieve the above purpose, the striking device according to the invention is a striking device that includes a striking section striking a test object, and is characterized by having: a vertically long intermediate link that is coupled to the striking section and can move in a state of maintaining a vertical orientation; and a laterally long driving link and a driven link that is driven by the driving link, one end of each of the driving link and the driven link being rotatably coupled to the intermediate link, and the driving link and the driven link being parallel to each other, in that another end portion of each of the driving link and the driven link rotates about a rotational shaft that is provided in a perpendicular direction to a vertical line at a different position on the same vertical line.

Advantageous Effects of Invention

According to the invention, it is possible to accurately strike a striking point with a simple device configuration.

BRIEF DESCRIPTION OF DRAWINGS

FIG. 1 is a perspective view illustrating a schematic configuration example of a striking device according to this embodiment.

FIG. 2 is a view in which the striking device according to this embodiment is seen in a lateral direction.

FIG. 3 is a first view for explaining operation of the striking device according to this embodiment.

FIG. 4 is a second view for explaining the operation of the striking device according to this embodiment.

FIG. 5 is a view illustrating a modified example of the striking device according to this embodiment.

DESCRIPTION OF EMBODIMENTS

A description will hereinafter be made on an embodiment of the invention.

[Configuration Example of Striking Apparatus]

FIG. 1 is a perspective view illustrating a schematic configuration example of a striking device according to this embodiment. FIG. 2 is a view in which the striking device according to this embodiment is seen in a lateral direction.

A striking device 1 illustrated in FIG. 1 and FIG. 2 has a base 2, a first side plate 3, a second side plate 4, a fixed frame 5, a driving link (a first arm) 6, a driven link (a second arm) 7, an intermediate link (a third arm) 8, a striking section coupling section (a fourth arm) 9, a striking section 10, a first striking speed primary adjustment section 11, a first striking speed secondary adjustment section 12, a second striking speed adjustment section 13, a detection section 14, a control section 15, and the like. FIG. 1 and FIG. 2 each illustrate arrangement of each component of the striking device 1 in a non-operating state.

For convenience of the description, an X-axis direction and a Y-axis direction in a three-dimensional coordinate system illustrated in FIG. 1 will respectively be referred to as a right-left direction and a front-rear direction. In FIG. 1, the first side plate 3 is indicated by broken lines. Meanwhile, in FIG. 2, the first side plate 3, the detection section 14, and the control section 15 are not illustrated.

The base 2 is a portion that serves as a substantially rectangular-parallelepiped foundation. A secondary base 21 is disposed substantially at a center of this base 2. The secondary base 21 includes an upper surface that is perpendicular to a long-axis direction of the driving link 6 and the driven link 7. The base 2 and the secondary base 21 are each formed of stainless steel such as SUS 304 or an epoxy resin.

At right and left ends of the base 2, level adjustment screws 22, 23 are provided in a manner to penetrate upper and lower surfaces of the base 2 perpendicularly. These level adjustment screws 22, 23 are screws which are used to arrange the base 2 horizontally and, to a lower end of each of which, for example, a level adjustment locknut, that is, a horizontal bottom surface portion is attached. Each of these level adjustment screws 22, 23 is a resin screw that is formed of a resin, for example.

In order to suppress vibration transmission to the level adjustment screws 22, 23, when these level adjustment screws 22, 23 are provided in the manner to penetrate the base 2, a rubber buffer with a thickness of approximately 0.5 to 1 mm is preferably interposed between the base 2 and each of the level adjustment screws 22, 23. In addition, the locknut at the lower end is preferably covered with a rubber buffer. Furthermore, the level adjustment screws 22, 23 are preferably added with a function to automatically adjust a level so as to be able to appropriately set a striking point by the striking section 10. The number of the level adjustment screws 22, 23 to be disposed and the positions where the level adjustment screws 22, 23 are disposed are not limited to the positions illustrated in FIG. 1 and FIG. 2.

The first side plate 3 and the second side plate 4 are plate-shaped members which are respectively erected in parallel at front and rear ends of the base 2 with a predetermined clearance being disposed therebetween and, each of which is formed of carbon fiber or Japanese ash wood, for example. These first side plate 3 and second side plate 4 support shaft members Y1, Y2 that are rotational shafts of the driving link 6 and the driven link 7, which will be described below.

The first side plate 3 is formed with a hole section 31 for the shaft member Y1 and a hole section 32 for the shaft member Y2 as through-holes that separate from each other by a predetermined distance in a height direction. The second side plate 4 is formed with a hole section 41 for the shaft member Y1 and a hole section 42 for the shaft member Y2 as through-holes that separate from each other by the same distance as the distance between the hole sections 31, 32 in the height direction.

The fixed frame 5 is a U-shaped frame member that is disposed diagonally upward on right end sides of the first side plate 3 and the second side plate 4 in a manner to sandwich both of the side plates 3, 4 and that is formed of the carbon fiber or Japanese ash wood, for example. An upper end of the first striking speed primary adjustment section 11 is fixed to an upper back surface of this fixed frame 5. Here, a direction in which the fixed frame 5 is disposed is a perpendicular direction to the long-axis direction of the driving link 6 and the driven link 7.

The driving link 6 and the driven link 7 are laterally long members that are parallel to each other and are each formed of the carbon fiber or Japanese ash wood, for example. As it is understood from FIG. 2, the driven link 7 has a shorter length than the driving link 6 in the right-left direction. A drive plate 6a as a laterally long plate-shaped member is fixed to an upper surface of the driving link 6. The second striking speed adjustment section 13 actuates the striking device 1 by pushing down this drive plate 6a. The drive plate 6a is formed with a hole section 6b through which one end side of the first striking speed primary adjustment section 11 can move in a long-axis direction of the drive plate 6a.

These driving link 6 and driven link 7 are rotatably coupled to the intermediate link 8 via shaft members Y3, Y4, respectively. The shaft members Y3, Y4 penetrate left ends (one ends) of the respective links in the front-rear direction. On a right side (the other end side) of these coupled portions, the driving link 6 and the driven link 7 are rotatably coupled to the first side plate 3 and the second side plate 4 via the shaft members Y1, Y2 as the rotational shafts that are provided to penetrate the respective links at different positions in a vertical direction.

In the non-operating state illustrated in FIG. 1 and FIG. 2, each of these driving link 6 and driven link 7 is disposed to be inclined downward from the left end toward the right end.

Meanwhile, as illustrated in FIG. 4, which will be described below, each of the driving link 6 and the driven link 7 is configured to be brought into a horizontal state at the time when the striking section 10 strikes a striking point T.

Each of the shaft members Y1, Y2, Y3, Y4 is a columnar shaft body that is formed in a columnar shape and is formed of stainless steel, for example. In particular, front and rear ends of the shaft member Y1 are respectively fixed to the hole sections 31, 41, and front and rear ends of the shaft member Y2 are respectively fixed to the hole sections 32, 42. A front end side of the shaft member Y3 is fixed to the driving link 6, and a rear end side thereof is rotatably attached to the intermediate link 8. A front end side of the shaft member Y4 is fixed to the driven link 7, and a rear end side thereof is rotatably attached to the intermediate link 8.

The intermediate link 8 is a vertically long member that is formed of the carbon fiber or Japanese ash wood, for example. As it is understood from FIG. 1, at upper and lower positions in this intermediate link 8, the driving link 6 and the driven link 7 are rotatably coupled to the intermediate link 8 via the shaft members Y3, Y4. The striking section 10 is coupled to this intermediate link 8 via the striking section coupling section 9 and can move while maintaining a vertical orientation.

The striking section coupling section 9 is a member that is attached to a lower end of the intermediate link 8 and is formed of the carbon fiber or Japanese ash tree, for example. This striking section coupling section 9 is used to couple the intermediate link 8 and the striking section 10. A striking speed by the striking section 10 may be increased by installing a weight or the like to this striking section coupling section 9.

The driving link 6, the driven link 7, the intermediate link 8, and the striking section coupling section 9 described so far are each formed of a lightweight material such as the carbon fiber or Japanese ash tree.

The striking section 10 is a hammer that is coupled to the striking section coupling section 9 and is made of steel or a resin, for example. This striking section 10 may be a steel ball. This striking section 10 strikes a test object such as concrete when a hammering test is performed by using the striking device 1. When the striking section 10 is formed as the hammer, which is made of steel or the resin, or the steel ball, a variation in striking strength is reduced, and a stable waveform can thereby be detected. Thus, the striking device 1 can be applied as a striking device that generates high-frequency and low-frequency impact elastic waves. In a state of maintaining the vertical orientation with the intermediate link 8, the striking section 10 rotates about an apparent support point O (see FIG. 2). Here, a distance L0 between the support point O and center of gravity of the striking section 10 is the same as a distance L1 between the shaft member Y1 and the shaft member Y3.

The first striking speed primary adjustment section 11 penetrates a right end portion of the drive plate 6a in the up-down direction, and is disposed perpendicularly to the drive plate 6a. A top portion of a columnar shaft center section 11a (see FIG. 2) provided in the first striking speed primary adjustment section 11 is fixed to a back surface of the fixed frame 5. This first striking speed primary adjustment section 11 is a first mechanism that adjusts the striking speed by the striking section 10 by adjusting a speed related to rotation of the driving link 6 (the drive plate 6a).

As illustrated in FIG. 2, in this first striking speed primary adjustment section 11, a vertically long elastic body 11b such as a spring is attached to the shaft center section 11a, and this elastic body 11b is disposed between a top portion of the first striking speed primary adjustment section 11 (the back surface of the fixed frame 5) and an upper surface of the drive plate 6*a* such that none of upper and lower ends of the elastic body 11*b* is fixed.

Thus, when the second striking speed adjustment section 13 pushes down the drive plate 6*a* and then releases the drive plate 6*a*, the drive plate 6*a* first counteracts upward by self-weight of the striking section 10 and an elastic force of an elastic body 12*b*, which will be described. However, when a force that has a certain magnitude or more is applied to the elastic body 11*b*, the drive plate 6*a* is pushed back downward by an elastic force of the elastic body 11*b*. Inner circle sections such as washers 11*c*, 11*d* around the elastic body 11*b* illustrated in FIG. 2 are rounded.

The first striking speed secondary adjustment section 12 is disposed between the shaft member Y1 and a right end of the driving link 6 in a manner to support the driving link 6 from below, and a lower end of a columnar shaft center section 12*a* provided in the first striking speed secondary adjustment section 12 is fixed to the upper surface of the secondary base 21. This first striking speed secondary adjustment section 12 is a mechanism that assists the first striking speed primary adjustment section 11 with the adjustment of the striking speed of the striking section 10.

As illustrated in FIG. 2, in this first striking speed secondary adjustment section 12, the vertically long elastic body 12*b* such as a spring is attached to the shaft center section 12*a*, and this elastic body 12*b* is disposed between a lower surface of the driving link 6 and the upper surface of the secondary base 21 such that none of upper and lower ends of the elastic body 12*b* is fixed.

Thus, unlike the above-described elastic body 11*b*, when the second striking speed adjustment section 13 pushes down the drive plate 6*a* and then releases the drive plate 6*a*, the drive plate 6*a* first counteracts upward by self-weight of the striking section 10 and the elastic force of the elastic body 12*b*. The drive plate 6*a* that is thereafter pushed back downward by the elastic force of the elastic body 11*b* counteracts upward again by the elastic force of the elastic body 12*b*. Inner circle sections such as washers 12*c*, 12*d* around the elastic body 12*b* illustrated in FIG. 2 are rounded.

As it has been described so far, the elastic bodies 11*b*, 12*b* that are respectively provided to the first striking speed primary adjustment section 11 and the first striking speed secondary adjustment section 12 are provided to oppose the upper surface side and the lower surface side of the driving link 6 (the drive plate 6*a*), respectively. Thus, when the drive plate 6*a* is released from the state of being pushed down by the second striking speed adjustment section 13, the driving link 6 first counteracts upward with the largest displacement amount. Thereafter, the driving link 6 moves up and down while being damped by action of the two elastic bodies 11*b*, 12*b*. In this way, it is possible to prevent the striking section 10 from striking the test object twice. Here, the two elastic bodies 11*b*, 12*b* are each disposed such that the upper and lower ends thereof are not fixed. However, at least one of the upper and lower ends may be fixed. The first striking speed primary adjustment section 11 and the first striking speed secondary adjustment section 12 will be referred to as a first striking speed adjustment section when being collectively referred. One of the first striking speed primary adjustment section 11 and the first striking speed secondary adjustment section 12 may only be provided.

The second striking speed adjustment section 13 is a device that is provided to the right end of the base 2, has an unillustrated servo motor therein, and moves up and down a movement section 13*a*, which is projected to the drive plate

6*a* side, in the vertical direction. This second striking speed adjustment section 13 is a second mechanism that adjusts the striking speed by the striking section 10 by adjusting the speed related to the rotation of the driving link 6 (the drive plate 6*a*). Operation of this second striking speed adjustment section 13 is controlled by the control section 15, which will be described below.

This second striking speed adjustment section 13 determines a vertical movement area of the drive plate 6*a* at the time when the movement section 13*a* pushes down a right end of the drive plate 6*a*. As a position to which the drive plate 6*a* is pushed down is lowered, the elastic force that is based on compression of the elastic body 12*b* is increased, and a moving speed of the drive plate 6*a* and the striking speed of the striking section 10 after the release of the drive plate 6*a* from being pushed down are increased. This second striking speed adjustment section 13 is one of elements that determine the striking speed of the striking section 10. Here, instead of this second striking speed adjustment section 13, it may be configured to manually push down the drive plate 6*a*.

For example, the detection section 14 is an acoustic emission (AE) sensor that detects the elastic wave generated at the time when the striking section 10 strikes the test object. This detection section 14 is arranged near the striking section 10. The control section 15 is a general computer device that inspects a defect or the like of the test object on the basis of a waveform of the elastic wave detected by the detection section 14 and controls vertical movement of the movement section 13*a*. In particular, the strike strength by the striking section 10 can be adjusted by controlling the vertical movement of the movement section 13*a*. These detection section 14 and control section 15 are known techniques, and thus a description thereon will not be made herein.

As it has been described so far, the striking device 1 according to this embodiment includes a link mechanism that has the driving link 6, the driven link 7, and the intermediate link 8 to which these driving link 6 and driven link 7 are rotatably coupled. Thus, when the driving link 6 and the driven link 7 rotate about the shaft members Y1, Y2, respectively, the intermediate link 8, which is coupled to these driving link 6 and driven link 7, rotates in the state of maintaining the vertical orientation.

Accordingly, by utilizing the link mechanism just as described, the striking section 10 is structured to rotate about the apparent support point O in the state of maintaining the vertical orientation like the intermediate link 8.

As a result, the following advantage is achieved. The advantage is that a moving direction of the striking section 10 at the time of the strike can easily be set to a directly downward direction. In other words, dimensions are designed such that a vector applied to the driving link 6 (the drive plate 6*a*) at the time of the strike is oriented directly above. In this way, movement in the right-left direction caused by an impact at the time of the strike is suppressed. Thus, it is possible to suppress a position of the strike point from being shifted. A detail thereon will be described below with reference to FIG. 3.

Preferably, the elastic body 11*b* provided to the first striking speed primary adjustment section 11 and the elastic body 12*b* provided to the first striking speed secondary adjustment section 12 can be switched according to a type of the test object, or the like.

[Operation Example of Striking Apparatus]

FIG. 3 is a first view for explaining operation of the striking device according to this embodiment. FIG. 4 is a second view for explaining the operation of the striking device according to this embodiment.

In FIG. 3, the arrangement in the non-operating state illustrated in FIG. 2 is indicated by broken lines, and arrangement in a state where the movement section 13*a* of the second striking speed adjustment section 13 pushes down the drive plate 6*a* is indicated by solid lines. In particular, the solid lines in FIG. 3 indicate timing at which the drive plate 6*a* is released from being pushed down by the movement section 13*a*, and the state is thereafter shifted to a state illustrated in FIG. 4.

As indicated by the solid lines in FIG. 3, the driving link 6 and the driven link 7 respectively rotate clockwise in FIG. 3 about the shaft members Y1, Y2 only by an angle θ1. Similarly, the striking section 10 rotates about the apparent support point O by the angle θ1 and moves upward. Here, the elastic body 12*b* that is disposed under the driving link 6 is compressed.

Meanwhile, in FIG. 4, the arrangement in the non-operating state illustrated in FIG. 2 is indicated by broken lines, and a state at timing at which the striking section 10 strikes the test object (not illustrated) arranged at the striking point T is indicated by solid lines. In other words, in the above-described state indicated by the solid lines in FIG. 3, the driving link 6, the driven link 7, the striking section 10, and the like move on the basis of the self-weight of the striking section 10 and an urging force by the elastic body 12*b*, and are shifted to the state illustrated in FIG. 4.

As indicated by the solid lines in FIG. 4, the driving link 6 and the driven link 7 respectively rotate about the shaft members Y1, Y2 by an angle θ2 in a reverse direction (counterclockwise herein) from the direction by the above-described angle θ1 with the non-operating state being a reference. Similarly, the striking section 10 rotates about the apparent support point O by the angle θ2 with the non-operating state being the reference and moves downward.

At this time, as indicated by the solid lines in FIG. 4, the driving link 6 and the driven link 7 are brought into the horizontal state. As a result, a horizontal component of a speed vector of each of the driving link 6 and the driven link 7 becomes 0, and only a vertically downward component is present. Similarly, only a vertically downward component of a speed vector of each of the intermediate link 8 and the striking section 10 is present. In this way, the moving direction of the striking section 10 at the time of the strike is easily set to the directly downward direction, the movement of the striking section 10 in the right-left direction is suppressed, and it is thus possible to suppress the position of the strike point T from being shifted. Here, along with an elevation of the drive plate 6*a*, the elastic body 11*b* that is disposed above the driving link 6 is compressed.

As it has been described so far with reference to FIG. 3 and FIG. 4, in the striking device 1 according to this embodiment, the striking section 10 can strike the test object (not illustrated), which is arranged at the striking point T, with such a simple device configuration that, when the driving link 6 and the driven link 7 respectively rotate about the shaft members Y1, Y2, the intermediate link 8, which is coupled to these driving link 6 and driven link 7, and the striking section 10, which is coupled to the intermediate link 8 via the striking section coupling section 9, rotate in the similar manner.

Here, in the case where the elastic body 11*b* provided to the first striking speed primary adjustment section 11 and the elastic body 12*b* provided to the first striking speed secondary adjustment section 12 are the springs, the striking speed at the time of striking can be adjusted by controlling spring constants of these and the displacement amount at the time when the second striking speed adjustment section 13 moves up and down the movement section 13*a*.

[Modified Example of Striking Device]

FIG. 5 is a view illustrating a modified example of the striking device according to this embodiment.

FIG. 5 illustrates a striking device 1A according to the modified example of the striking device 1 illustrated in FIG. 1 and FIG. 2. A basic configuration of the striking device 1A illustrated in FIG. 5 is the same as that of the striking device 1 but differs in a point of having a striking section coupling section 9A instead of the striking section coupling section 9. The same components as those in FIG. 1 and FIG. 2 described above will be denoted by the same reference signs, and the overlapping description thereon will appropriately be omitted.

The striking section coupling section 9A is a substantially rectangular-parallelepiped member that is attached to the lower end of the intermediate link 8 and is formed of the carbon fiber or Japanese ash tree, for example. This striking section coupling section 9A is used to couple the intermediate link 8 and a striking section 10A. However, unlike the above-described striking section coupling section 9, the striking section coupling section 9A is configured that the striking section 10A is arranged in the vertical downward direction at a substantially central position of the striking device 1A in the right-left direction. The striking device 1A according to this modified example can be operated with a stable weight balance between the right and left sides by substantially disposing the striking section 10A at the center.

The striking section 10A is a hammer that is coupled to the striking section coupling section 9A and is made of steel or the resin, for example. This striking section 10A is the same as the above-described striking section 10.

By utilizing the link mechanism as illustrated in FIG. 5, the striking section 10A is structured to rotate about an apparent support point O1 (a distance L2 between the support point O1 and center of gravity of the striking section 10A is the same as the distance L1 between the shaft member Y1 and the shaft member Y3) in a state of maintaining a vertical orientation like the intermediate link 8.

The description has been made so far on the embodiment of the present invention. However, the above embodiment merely illustrates one of application examples of the invention, and it is not intended to limit the technical scope of the invention to the specific configuration in the above embodiment.

REFERENCE SIGNS LIST

1: Striking device
2: Base
6: Driving link
7: Driven link
8: Intermediate link
9, 9A: Striking section coupling section
10: Striking section
11: First primary striking speed adjustment section
11*a*: Elastic body
12: First secondary striking speed adjustment section
12*a*: Elastic body
13: Second striking speed adjustment section
14: Striking sound detection section
15: Control section

The invention claimed is:
1. A striking device comprising:
a striking section configured to strike a test object;

a vertically elongated intermediate link that is coupled to the striking section so as to be movable while maintaining a vertical orientation;

a laterally elongated driving link and a driven link that is driven by the driving link, the driving link and the driven link each having a first end and a second end, the first end of the driving link and the first end of the driven link being rotatably coupled to the intermediate link, and the driving link and the driven link being parallel to each other, wherein a second end side of the driving link rotates about a first rotational shaft and a second end side of the driven link rotates about a second rotational shaft, wherein the first and second rotational shafts extend in a direction that is perpendicular to a vertical line and are arranged at different positions on the same vertical line;

a first striking speed adjustment section that is provided to at least one of an upper surface side and a lower surface side of the second end side of the driving link and adjusts a speed related to rotation of the driving link; and a second striking speed adjustment section configured to adjust the speed related to the rotation of the driving link by controlling an amount of movement of the second end of the driving link while moving the second end of the driving link up or down, wherein the first striking speed adjustment section is an elastic body that is provided to at least one of the upper surface side and the lower surface side of the second end side of the driving link and is configured to be compressed along with the rotation of the driving link.

2. The striking device according to claim 1, wherein the striking section is configured to strike the test object, which causes the driving link and the driven link to be brought into a horizontal state.

3. The striking device according to claim 1, wherein the driving link and the driven link are each disposed to be inclined downward from the first end toward the second end in a non-operating state of the striking device.

4. The striking device according to claim 1, further comprising:

a control section and a detection section configured to adjust a strength of a strike by the striking section.

\* \* \* \* \*